United States Patent [19]

Noguchi

[11] Patent Number: 5,439,956

[45] Date of Patent: Aug. 8, 1995

[54] THERMO-CURABLE AND ULTRAVIOLET-CURABLE ADHESIVE CAPABLE OF HIGH PRECISION BONDING

[75] Inventor: Hiromichi Noguchi, Atsugi, Japan

[73] Assignee: Canon Kabushiki Kaisha, Tokyo, Japan

[21] Appl. No.: 193,883

[22] Filed: Feb. 9, 1994

[30] Foreign Application Priority Data

Jul. 9, 1988 [JP] Japan .............................. 63-170040

Related U.S. Application Data

[63] Continuation of Ser. No. 34,661, Mar. 22, 1993, abandoned, which is a continuation of Ser. No. 376,571, Jul. 7, 1989, abandoned.

[51] Int. Cl.$^6$ .................. C09J 163/02; C09J 163/04; C09J 175/16; C09J 163/10
[52] U.S. Cl. ............................. 522/92; 522/96; 522/97; 522/103
[58] Field of Search .................. 522/92, 96, 97, 103

[56] References Cited

U.S. PATENT DOCUMENTS

| | | | |
|---|---|---|---|
| 4,205,018 | 5/1980 | Nagasawa et al. | 522/92 |
| 4,357,219 | 11/1982 | Sattler | 522/92 |
| 4,888,269 | 12/1989 | Sato et al. | 522/92 |
| 4,937,172 | 6/1990 | Gervay | 522/92 |
| 5,068,257 | 11/1991 | Noguchi | 522/31 |
| 5,068,258 | 11/1991 | Noguchi | 522/31 |
| 5,068,259 | 11/1991 | Noguchi | 522/31 |
| 5,068,260 | 11/1991 | Noguchi | 522/31 |
| 5,068,262 | 11/1991 | Noguchi | 522/95 |
| 5,068,263 | 11/1991 | Noguchi | 522/109 |

FOREIGN PATENT DOCUMENTS

| | | |
|---|---|---|
| 2456134 | 5/1980 | France . |
| 1040311 | 2/1986 | Japan ..................... 522/92 |
| 2032938 | 5/1980 | United Kingdom . |
| 2055860 | 3/1981 | United Kingdom . |

*Primary Examiner*—Susan W. Berman
*Attorney, Agent, or Firm*—Fitzpatrick, Cella, Harper & Scinto

[57] ABSTRACT

An adhesive for use in bonding finely processed parts such as parts of ink jet recording head has a composition which essentially contains: (A) a vinylester compound of an urethanated epoxy resin; (B) a partial vinylester compound of a multi-functional epoxy resin; (C) an acrylic reactive diluent; (D) a photopolymerization initiator; and (E) an epoxy cure agent. This adhesive is curable by ultraviolet irradiation or by application of heat, and does not flow or spread into areas where bonding is not necessary, so that finely processed parts are bonded with a high degree of precision of the bonding pattern.

8 Claims, 2 Drawing Sheets

EPOXY RESIN HAVING HYDROXYL GROUP

VINYL ESTER GROUP --------- A

POLYOL COMPOUND ---------- HO〜〜〜OH

URETHANE GROUP ---------- U

THERMO-CURABLE AND ULTRAVIOLET-CURABLE ADHESIVE CAPABLE OF HIGH PRECISION BONDING

This application is a continuation of application Ser. No. 08/034,661 filed Mar. 22, 1993, now abandoned, which is a continuation of application Ser. No. 07/376,571 filed Jul. 7, 1989, now abandoned.

BACKGROUND OF THE INVENTION

1. Field of the Invention

The present invention relates to an adhesive and, more particularly, to an adhesive which can suitably be used in bonding parts of various devices such as optical devices, liquid crystal display devices, fluid devices, ink jet heads, and other finely processed parts.

2. Related Background Art

Hitherto, adhesives of acryl-type, polythiol-type and polyene-type have been used for the purpose of bonding optical parts, because of their advantages such as high transparency, low viscosity without the aid of any solvent, and high cure speed by irradiation with ultraviolet rays.

Bonding of parts of a liquid crystal display device employs an adhesive which is applied in a predetermined pattern by printing or by transfer from a transfer sheet. Epoxy-type adhesives are usually used in this field.

These known adhesives generally exhibit high fluidity at normal temperatures so that they tend to flow and spread to regions where the application of adhesive is not necessary. This tendency is quite undesirable in bonding finely processed parts such as parts of an ink jet head or a liquid crystal display device, and adversely affects the quality of the products. In the production of an ink jet recording head, for example, a pair of plates having finely processed protrusions and recesses as shown in FIGS. 1(a) and 1(b) are bonded together at their protrusions by means of an adhesive 3 so as to form fine liquid channels 4. If the adhesive 3 spreads into the fine liquid channels 4, the ink discharge characteristics of such channels 4 are undesirably changed. In the worst case, the fine liquid channel 4 may be completely blocked by the adhesive 3 with the result that the ink jet recording head cannot operate at all. In the case of a liquid crystal display device, a spread of an adhesive to an area where bonding is not necessary may impair the display function or, in the worst case, completely disables the display.

On the other hand, adhesives have been proposed and used which have minimum fluidity and, hence, exhibit a minimal tendency of flowing or spreading. Examples of such adhesives are: hot melts to vinyl chloride-type or vinyl acetate-type, B-staged epoxy resin film, and adhesive films of thermoplastic polyester, polyamide and polyimide. These adhesives or adhesive film are used under application of heat by a local heating method. Since the bonding can be finished in quite a short time, and since the fluidity is very low, these adhesives or adhesive films are suitably used in bonding parts of ink jet recording heads or liquid crystal display devices. As mentioned above, these adhesives or adhesive films are used under application of heat produced by a local heating which is typically supersonic heating or microwave heating. In general, however, the mounting of parts to be bonded on the local heating apparatus encounters various restrictions. In addition, such local heating apparatus are expensive. It should also be pointed out that the adhesive film can be used only in bonding flat surfaces.

In the case of the production of a liquid crystal display device, the adhesive is applied in a predetermined pattern by printing or by transfer from a transfer sheet. There is a practical limit in the precision of positional alignment of the pattern. In addition, the resolution of the pattern also has a practical limit of 0.2 mm or so. Thus, this bonding method cannot be employed when higher bonding precision is required.

SUMMARY OF THE INVENTION

Accordingly, an object of the present invention is to provide a novel adhesive which does not spread to areas where the bonding is not necessary and which can easily be applied in a predetermined pattern with a high degree of precision, thereby overcoming the above-described problems of the prior art.

Another object of the present invention is to provide an ultraviolet- and thermo-curable adhesive which has high separation resistance and high anti-chemical characteristics and which is highly transparent after the cure and, hence, can suitably be used in surface bonding between two parts where transparency is an important requisite at least with one of these parts.

Still another object of the present invention is to provide an adhesive which can form a highly precise adhesive pattern through an ultraviolet exposure and development in a desired pattern, thus meeting the requirement of bonding with a high degree of precision.

A further object of the present invention is to provide an adhesive which can be formed as a solid or, even when formed as a liquid, can exhibit, by an ultraviolet irradiation, a high cohesion force while maintaining wettability of the surfaces to be bonded, thus minimizing flowing and spreading into areas where bonding is not necessary, so that bonding with high precision is possible without necessitating pattern exposure.

A further object of the present invention is to provide an adhesive which contains:
(A) a vinylester compound of an urethanated epoxy resin;
(B) a partial vinylester compound of a multi-functional epoxy resin;
(C) an acrylic reactive diluent;
(D) a photopolymerization initiator; and
(E) an epoxy cure agent.

EMBODIMENTS

Figure 1:
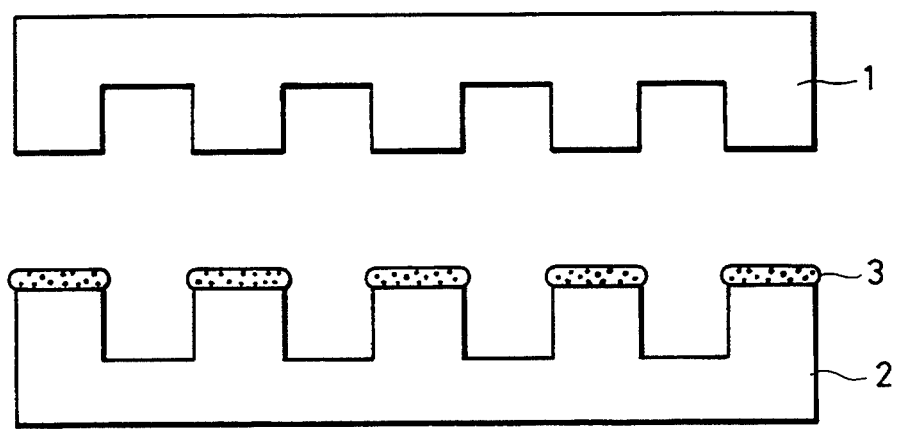
FIGS. 1(a) and 1(b) are schematic illustrations of parts of an ink jet recording head, illustrating an example of application of an adhesive in accordance with the present invention.
Figure 1:
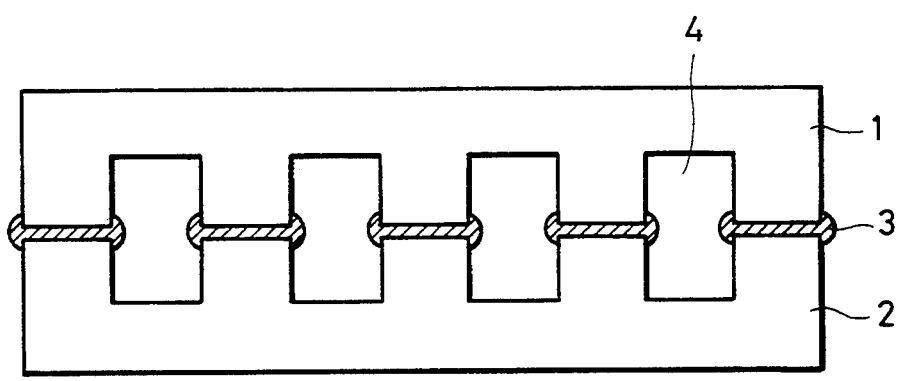
Figure 2:
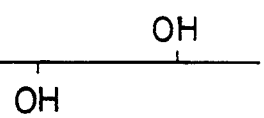
FIGS. 2 and 2(a) to 2(e) are schematic illustrations of molecular structures of a component (A) of the adhesive in accordance with the present invention.
Figure 2A:
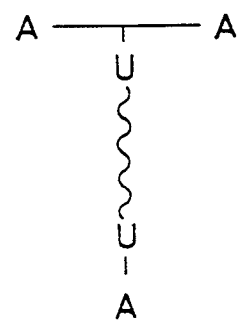
Figure 2B:
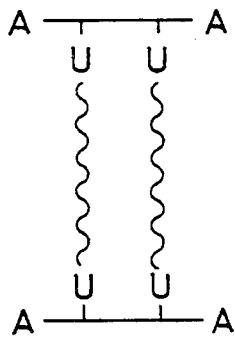
Figure 2C:
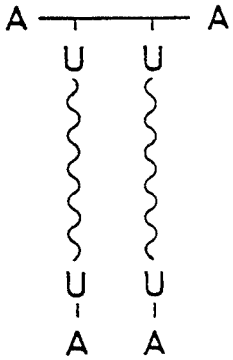
Figure 2D:
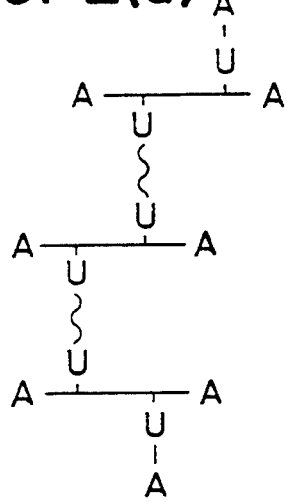
Figure 2E:
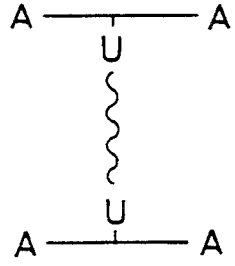

A description will be given of the adhesive in accordance with the present invention.

The adhesive of the present invention contains at least the following components (A) to (E).

Component (A): a vinylester compound of an urethanated epoxy resin;
Component (B): a partial vinylester compound of a multi-functional epoxy resin;
Component (C): an acrylic reactive diluent;

Component (D): a photopolymerization initiator; and
Component (E): an epoxy cure agent.

The adhesive of the invention, which contains at least the components (A) to (E) mentioned above, simultaneously exhibit both ultraviolet-curability and thermo-curability. When the adhesive of the present invention is used, therefore, bonding can be conducted by applying the adhesive to one or both of parts to be bonded, irradiating the adhesive with ultraviolet rays before or after superposing these parts so as to primarily set the adhesive to develop a low fluidity which does not allow the adhesive to spread to areas where the bonding is not necessary, and then applying heat to completely set the adhesive, thereby bonding the parts. The fluidity of the adhesive of the invention can freely be controlled by controlling the time and/or intensity of the ultraviolet irradiation.

The adhesive of the present invention exhibits a sufficiently high bonding strength when it is set thermally.

By using the adhesive of the present invention, therefore, it is possible to easily conduct bonding of two parts with a high bonding strength while minimizing spreading of the adhesive to areas where the bonding is not necessary.

The adhesive of the present invention is originally soluble to solvents of trichloroethane-type or cellosolve-type, but becomes insoluble to such solvents when partially hardened by an ultraviolet irradiation. It is therefore possible to form a minute or fine pattern of adhesive by conducting the ultraviolet irradiation across a mask of a desired pattern and then dissolving and removing the non-exposed portion of the adhesive by means of the solvent.

Detailed description will be given hereinafter of each of the essential components (A) to (E).

The component (A) is a vinylester compound of an urethanated epoxy resin, having a molecular structure schematically shown in FIGS. 2(a) to 2(e). The compound of the component (A) can typically be prepared by either one of the following two methods.

According to the first method, secondary hydroxyl groups of epoxy resin, which is obtained by a reaction between bisphenol A or novolak resin and epichlorohydrin, are urethanated and then the functional groups (epoxy groups and isocyanate groups) of the urethanated epoxy resin are vinyl-esterified.

According to the second method, secondary hydroxyl groups of vinylester compound of epoxy resin ,obtained through reaction between bisphenol A and epichlorohydrin, are urethanated and then the functional groups (isocyanate groups) of the vinylester compound of the urethanated epoxy resin are vinyl-esterified.

In each of the first and second methods mentioned above, the urethanation is effected by bringing diisocyanate into reaction with polyester polyol, polyether polyol or a liquid rubber with terminal hydroxy groups. As the above diisocyanate, bifunctional isocyanate such as tolylene diisocyanate, 1,6-hexanediol isocyanate, diphenylmethane diisocyanate and isophorone diisocyanate can be employed. The polyesterpolyol is a polyester on the terminal end of hydroxy group having molecular weight of 200 to 3000, composed of an alcoholic component such as ethyleneoxide, propyleneoxide, 1,6-hexanedial or diethyleneglycol, and an acidic component such as adipic acid, phthalic acid, succinic acid, glutanic acid, sebacic acid,pimelic acid,azealic acid or isophthalic acid. Polymers of caprolactone also art, included by the polyesterpolyol. On the other hand,the polyetherpolyol is a polyether on terminal hydroxy group of molecular weight ranging between 300 and 2000, obtained from an open ring copolymers such as polyethyleneoxide, polypropyleneoxide or polytetrahydrofuran. The liquid rubber with terminal hydroxy groups may be 1,2-polybutadiene, e.g., NISSO-PBG-1000 (Trade name,produced by Nippon Soda Company Ltd.) or a nitrile rubber.

The vinyl-esterification in the first method may be effected with a methacrylate or an acrylic acid containing hydroxy groups, represented by 2-hydroxyethylmethacrylate. On the other hand, the vinyl-esterification in the second method may be effected using an acrylester monomer containing hydroxy groups.

The component (B) is a partial vinylester compound of a multi-functional epoxy resin. This is a substance in which 30 to 70% of the number 1 of epoxy groups in a molecule ($l \geq 2$)has been vinyl-esterified by an acrylic acid or a methacrylic acid. Examples of the multi-functional epoxy resin suitably used are: epoxy resins of phenol novolak-type, cresol novolak-type and bisphenol-type; vinyl oligomers of vinylcyclohexaneoxide, TETRAD-Y and TETRAD-D which are products of Mitsubishi Gas Chemical Company, Inc., tetrahydroxyphenylmethane tetraglycidylether, resorcinol diglycidylether, glycerinetriglycidylether, pentaerythritol triglycidylether, triglycidylether isocyanurate, and so forth.

Partial vinylester compounds exhibit a high reactivity in photo-polymerization. Thus, the cross-linking density of this component is enhanced by irradiation with light rays so as to impart rigidity to the adhesive layer of adhesive of the invention. In addition,partial vinylester compound is expected to form an internal penetrating network through thermal reaction between epoxy groups, so as to improve elastic modulus and strength of the adhesive layer.

The acrylic reaction diluent of the component(C) is mono- to quadri-functional acrylic monomer having a low viscosity. This component imparts fluidity to the adhesive compound before the cure. Most of the components (A) and (B) are prepared in solid phase. The component (C) serves as a medium for enabling dissolution of such solid components (A) and(B) thereby to develop fluidity. The component (C) also increases the wetting effect of the adhesive in the set state on the surface to be bonded, thus improving affinity. The component (C) further enables control of physical properties of the adhesive layer, and contributes to an increase in the initial polymerization speed in the photopolymerization. Substances usable as the acrylic reaction diluent of the component (C) are shown below.

Mono-functional substances vinylpyrrolidone, benzyl (meth)acrylate, 2-hydroxyethylacrylate, 2-hydroxypropyl acrylate, 4-hydroxybutyl (meth)acrylate, dicyclopentenyl (meth)acrylate, aqueous dicyclopentenyl (meth)acrylate, dicyclopentenyl oxyethyl (meth)acrylate, aqueous dicyclopentenyl oxyethyl (meth)acrylate, dicyclopentenyl ethyl (meth)acrylate, aqueous dicyclopentenylethyl (meth)acrylate, isobronyl (meth)acrylate, isobornyl oxyethyl (meth)acrylate, tetrahydrofurfural (meth)acrylate.

Multi-functional Substances 1,3-butanedioyl di(meth)acrylate, 1,4-butanedioyl di(meth)acrylate, 1,6-hexanedioyl di(meth)acrylate, neopentylglycol di(meth)acrylate, dietyleneglycol di(meth)acrylate, polyethyleneglycol 400 diacrylate, hydroxypivalate ester neopentylglycol diacrylate, dicyclopentenyl dioxyethyl(meth)acrylate, trimethylolpropene triacrylate, pentaerythritol triacrylate, dipentaerythritol hexacrylate.

The substance used as the photopolymerization initiator of the component (D) should exhibit high solubility to the mixture of the components (A), (B) and (C) and be capable of initiating polymerization upon irradiation with ultraviolet rays. No specific consideration is necessary in regard to oxygen inhibition when selecting the initiator.

Examples of such a photo-polymerization initiator are: benzyl and benzoinalkylethers such as benzoinisobutylether, benzoinisopropylether, benzoin-n-butylether, benzoinethylether, and benzoinmethylether; anthraquinones such as benzophenone, 4,4-bis(N,N-diethylamino) benzophenone and benzophenone methylether; xanthones such as 2-ethylanthraquinone and 2-t-butylanthraquinone; acetophenones such as 2,4-dimethyloxanthone and 2,4-diisopropylthioxanthone; substances such as 2,2-dimethoxy-2-phenylacetophenone, α, α-dichloro-4-phenoxyacetophenone, p-tertbutyltrichloroacetophenone, p-tertbutyldichloroacetophenone, 2,2-diethoxyacetophenone, p-dimethylaminiacetophenon. Other materials suitably used as the photo-polymerization initiator are: hydroxy cyclohexyl phenylketone, e.g., IRGACUR 184 (trade name, produced by Ciba Geigy Co.), 1-(4-isopropylphenyl)-2-hydroxy-2-methylpropane-1-on, e.g., DAROCURE 1173 (trade name, produced by MERCK Co. ), and 2-Hydroxy-2-methyl-1-phenyl-propane-1-on, e.g., DAROCURE 1173 (trade name, produced by MERCK Co.). It is possible to use an amino compound as a photo-polymerization promoter, in addition to the above-mentioned photo-polymerization initiator.

Amino compounds suitably used as the photo-polymerization initiator are: ethanol aminoethyl-4-dimethyl aminobenzoate; 2-(dimethylamino)ethylbenzoate, p-dimethyl aminobenzoate n-amylester; and p-dimethyl aminobenzoate isoamylester.

The epoxy cure agent used as the component (E) of the adhesive of the present invention may be a potential cure agent or high-temperature cure agent such as imidazole derivative, hydrazide, dicyandiamide, aromatic anhydride polyphenol compound and $BF_3$-amine salt. Practical examples of such a material are: 2-ethyl 4-methylimidazole, methyltetrahydro phthalic anhydride; methylhexahydro phthalic anhydride; bisphenol A; bisphenol S; resorcin; novolak and so forth. Aluminum complex/alkoxysilane can also be used suitably as the epoxy cure agent.

The adhesive of the present invention can contain, as desired, the following components in addition to the above-described components (A) to (E).

Component (F): Polymeric substance compatible with the essential components (A) to (E).

Component (G): Organic solvent capable of dissolving the essential components (A) to (E).

The polymeric substance of the component (F) is added when the adhesive of the present invention is used, for example, under the following conditions:

(1) When it is desired to control fluidity, adhesion or softening point of the adhesive before cure; or
(2) When it is desired to reduce swelling of selectively irradiated region to a developing solution, during developing treatment by selective ultraviolet irradiation on the film of the adhesive of the invention.

As the polymeric substance used as the additional or optional component (F), acrylic polymers are preferably but not exclusively used because such polymers exhibit high compatibility to the essential components (A) to (E) and allow easy control of glass transition temperature, rigidity of molecule chains and flexibility of the same. The polymeric substance preferably has a glass transition point ranging between $-50°$ C. and $60°$ C.

The organic solvent of the additional or optional component (G) is used when the fluidity of the adhesive of the invention is to be increased. Examples of the organic solvent suitably used are solvents of ketone-type, ester-type, glycol-type, glycol-ether-type and glycol-ester-type, as well as solvents such as toluene, xylene and isopropylalcohol.

Thus, the adhesive of the present invention is composed of the components (A) to (E) with or without the additional components (F) and (G). The component ratio of the components (A) to (C) generally falls within the range of (A):(B):(C)=20–60 wt %: 20–60 wt %: 10–40 wt %. The content of the component (D) is 1 to 10 weight parts when the sum of components (A)+(B)+(C) is 100 weight parts. The content of the component (E) is 1 to 10 weight parts for 100 weight parts of the component (B). The content of the component (F), when this component is added, is not restricted but generally ranges between 5 and 20 weight parts when the sum of the components (A)+(B)+(C) is 100 weight parts.

The adhesive of the present invention may be referred to as "photo- and heat-sensitive adhesive" and can be used in various ways, two typical examples of which are shown below.

(1) Bonding of two parts having protrusions and recesses on their surfaces, at least one of the parts being transparent.

When two parts having protrusions and recesses on their surfaces as schematically shown in FIGS. 1(a) and 1(b) are to be bonded together, the adhesive of the present invention is applied to one of the parts by means of a roll coater so as to form a solid adhesive film. In this state, the fluidity of the adhesive is minimized small due to a reduction in the temperature or evaporation of the solvent, so that the adhesive does not flow into the recesses. Then, the other part is pressed onto the part having the adhesive film and heat is applied to heat the structure up to a predetermined temperature. Ultraviolet irradiation is effected without delay so as to polymerize and set the adhesive. Subsequently, the adhesive is thermally set by being heated under conditions which may vary between 100° C./3 hours and 180° C./30 minutes.

(2) Bonding of two parts by applying the adhesive in a predetermined pattern to the surface of one of the parts.

The adhesive of the present invention is applied to the surface of one of the parts to be bonded in a thickness of 1 to 100 μm. The part with the adhesive film thus applied is heated as required at 40° to 80° C. for evaporation drying. Subsequently, a mask film of a predetermined pattern is laid on the part having the adhesive film and an ultraviolet irradiation is executed under conditions which ranges between 40 and 400 $mJ/cm^2$.

Subsequently, development is executed with trichloroethane or a cellosolve-type solvent so as to obtain the desired pattern of adhesive. Then, the other part to be bonded is placed on the part having the patternized adhesive and curing is conducted at 80° to 180° C. for 30 minutes to 3 hours. Thus, the adhesive is applied to the desired portions of the part to be bonded with high degree of positional precision, whereby a strong bond can be attained.

The adhesive of the present invention described hereinbefore is ultraviolet- and thermo-curable, and exhibits a high separation resistance, as well as large anti-chemical resistance. In addition, the adhesive after cure exhibits a high level of transparency so that it can suitably be used in the case where the transparency of at least one of the parts bonded is an important factor.

According to the invention, it is also possible to form a highly precise adhesive pattern through an exposure to ultraviolet rays followed by development. The adhesive of the present invention therefore is useful particularly in a field which requires a high degree of precision.

The adhesive of the invention can be prepared in the form of a solid or a liquid. The adhesive, even when prepared as a liquid, can be changed into a partially set state with increased cohesion while maintaining wettability, by irradiation with the ultraviolet rays. It is therefore possible to minimize undesirable flowing and spreading of the adhesive when the adhesive is used in surface bonding. It is also therefore possible to attain a high bonding precision even when the steps of pattern exposure and development are omitted.

DETAILED DESCRIPTION OF THE PREFERRED EMBODIMENTS

The invention will be described in more detail with reference to preferred embodiments.

A description will be given first of preparation of the component (A)

Preparation 1

208 g of an epoxy resin having a repetition unit number n of 1 (n=1), actually EPIKOTE 1001 (trade name, produced by Shell Chemical Co.) was dissolved in 700 g of toluene at 80° C. Then, 100 g of polypropylene glycol having a molecular weight of 600 was added to this solution and was uniformly dissolved in the solution. Subsequently, 53 g of tolylene diisocyanate was dripped into the solution within a period of two hours while stirring the solution at 80° C., thereby effecting the reaction. Then, the solution was maintained at 80° C. for 6 hours to allow the reaction to proceed. Then, 1.6 g of the toluene solution of dibutyl dilaurylate was added to allow the reaction to take place and continue for 1 hour, thus completing the urethanation reaction. Then, 47 g of acrylic acid, as well as 2.0 g of trimethyl benzyl ammonium chloride as a catalyst, was added to the solution and the solution was heated to and maintained at 95° C. for 3 hours, so that a reaction was caused to vinyl-esterify the epoxy groups, thus forming a vinylester compound of urethanated epoxy resin which is to be used as the component (A) of the adhesive of the present invention.

Preparation 2

A solution was prepared by dissolving 382 g of a vinylester compound (NK ester EA-800, manufactured by Shin Nakamura Kagaku K.K.) in 850 g of toluene at 80° C. Then, 350 g of a polyesterpolyol, composed mainly of adipic acid and ethylene glycol, and having a molecular weight of 350 was dissolved in this solution and uniformly mixed therewith. Subsequently, 320 g of tolylene diisocyanate was dripped for a period of 4 hours while stirring the solution maintained at 80° C. Then, 120 g of 2-hydroxyethylacrylate was added to the solution while maintaining the solution at 80° C. to allow a reaction to proceed for 3 hours. Then, 1.6 g of toluene solution of dibutyl dilaurylate was added and allowed to react for 1 hour, thus completing the reaction, whereby a vinylester compound of urethanated epoxy resin usable as the component (A) of the present invention was obtained.

A description will be given of an example for preparation of the component (B).

Preparation 3

220 g of cresol-novolak-type epoxy resin having a mean condensation degree of 6 to 7 was dissolved in 600 g of benzene, and 3 g of trimethyl benzyl ammonium chloride as a catalyst was added to the solution. Then, 42 g of acrylic acid was dripped at 70° C. into the solution while stirring the solution so as to allow a reaction to proceed. Then, the solution after the reaction was suspended in water and the water was stirred so that the catalyst and the non-reacted acrylic acid were shifted to aqueous phase so as to separate oil phase. The oil phase was then extracted and vacuum-distilled at 90° C. so as to remove benzene, whereby a cresol novolak-type epoxy resin in which about half of the epoxy groups have been vinyl-esterified was obtained.

EXAMPLES 1–3

A plurality of Examples of photo- and heat-sensitive adhesive in accordance with the invention were prepared by using components with different composition ratios (weight ratio) as shown in Table 1. The compound prepared by the Preparation 1 or Preparation 2 was used as the component (A), while the compound prepared by the Preparation 3 was used as the component ( B ). As the component ( C ), dicyclopentenyl oxyethyl methacrylate (trade name FA-512A, produced by Hitachi Chemical Co., Ltd. ) was used, whereas 2-hydroxy-2-methyl-1-phenylpropane-on (produced by MERCK Japan) was used as the component (D). The component (E) used in these Examples was 2-ethyl-4-methylimidazole or methyl methacrylate/2-hydroxyethylmethacrylate (80/20) copolymer (molecular weight $5.7 \times 10^4$, linear polymer). Ethyl cello solve acetate was used as the solvent.

Comparison Examples 1–2

Conventional adhesives were prepared as Comparison Examples, using the following components at ratios as shown in Table 2: a vinylester compound of bisphenol A-type epoxy resin, more precisely NK ester EA-800 or DICRITE UE-8400, both being vinylester compounds produced by Dainippon Ink and Chemicals Corporated; full acrylester of cresol-novolak-type epoxy resin (condensation degree being 6 to 7); and FA-512, DAROCURE 1173 and ethyl cello solve acetate which were used in Examples 1 to 3.

The adhesives of Examples 1 to 3 and Comparison Examples 1 and 2 were tested and evaluated as follows in terms of bonding tightness and amount of spread-out. Evaluation of the adhesives of Examples 1 to 3 and Comparison Examples consisted of initially preparing each of the test examples by applying each of the respective adhesives to 10 cm long, 10 cm wide and 1.1 mm thick separate pieces of Pyrex glass (trade name, produced by Corning) by means of a bar coater. The adhesives were then evaporation-dried at 80° C. for 15 minutes to allow

TABLE 1

|  | Example 1 | Example 2 | Example 3 |
|---|---|---|---|
| Component (A) Compound of Preparation 1 | 50 |  | 80 |
| Component (A) Compound of Preparation 2 |  | 50 |  |
| Component (B) Compound of Preparation 3 | 50 | 50 | 80 |
| Component (C) FA-512A | 30 | 30 | 40 |
| Component (D) DAROCURE 1173 | 5 | 5 | 10 |
| Component (E) 2-ethyl4-methylimidazole | 5 | 5 | 1 |
| Component (F) Acrylic copolymer |  |  | 100 |
| Solvent Ethyl cellosolve | 150 | 200 | 350 |

TABLE 2

|  | Comparison Example 1 | Comparison Example 2 |
|---|---|---|
| NK ester EA-800 | 50 |  |
| Dicrite UE-8400 |  | 50 |
| Full acrylic acid ester of cresol-novolak-type epoxy resin | 50 | 50 |
| FA-512A | 30 | 30 |
| Darocure 1173 | 5 | 5 |
| Ethyl cellosolve | 150 | 150 | the solvent to evaporate. After cooling, the sample adhesives were placed on a belt moving at 5 m/min past a position which is 20 cm apart from the high-pressure mercury lamp of 80 W/cm, followed by 1-hour heat treatment at 150° C. The thus prepared test pieces were subjected to the following tests, the results of which are shown in Table 3.

TABLE 3

|  | Examples | | Comparison Examples | |
|---|---|---|---|---|
|  | 1 | 2 | 1 | 2 |
| Checkerboard Tape Separation Industrial Cellotape JIS-K5400-1979 | 100/100 | 100/100 | 20/100 | 20/100 |
| Boiling test 5-hours using H₂O | Tight Bond | Tight Bond | Separated | Separated |

As can be seen from Table 3, the Examples of adhesive produced in accordance with the invention showed superior bonding tightness to a glass sheet as compared with the Comparison Examples which are conventionally used adhesives.

Evaluation 2

Adhesives of Examples 1 and 2 and Comparison Examples 1 and 2 were applied to a PYREX glass substrate by means of a gravure coater in a striped pattern of 0.1 mm wide, and were dried for 15 minutes at 80° C. The thickness of the adhesive films was about 7 μm. The thus obtained test pieces were irradiated by super-high-pressure mercury lamp (irradiation energy of 7 mW/cm² at wavelength 365 mm) for 5 seconds. The irradiated test pieces were placed on a hot plate at 80° C. and other glass pieces were pressed onto these test pieces with 60-second irradiation by the above-mentioned super-high-pressure mercury lamp, followed by a 60-minutes heat-treatment at 150° C.

The thus bonded glass test pieces were then subjected to the following tests to obtain the results as shown in Table 4.

TABLE 4

|  | Examples | | Comparison Examples | |
|---|---|---|---|---|
|  | 1 | 2 | 1 | 2 |
| State of bonding portion with set resin (Note 1) | ○ | ○ | Δ | Δ |
| Separation test (Note 2) | ○ | ○ | X | X |

Note 1
Mark ○ represents that adhesive has been set and bonded to both glass sheets in the stripe-shaped pattern in good order. Mark Δ represents that the adhesive has been set but two glass sheets were separated at some local portions.
Note 2
A cutter blade was inserted into the gap between two glass sheets bonded together and force was applied to separate these glass sheets. The mark ○ means that the separation was failed due to breakage of the cutter blade, while the mark X represents that the glass sheets were separated easily.

As will be seen from Table 4, the Examples of the adhesive embodying the present invention exhibits higher strength of bonding to the glass sheets as compared with conventional adhesives of Comparison Examples.

Evaluation 3

Adhesives of Examples 1 to 3 and Comparison Examples 1 and 2 were applied onto glass substrates by means of a roll coater such that the adhesive layer has a thickness of 30 μm after drying. Then, a film mask of a predetermined bonding pattern was placed on the adhesive film and the adhesive film was subjected to an exposure to the same super-high-pressure mercury lamp for 20 seconds. After the exposure, the film mask was removed and development was conducted with 1,1,1 trichlorotoluene so as to dissolve and remove the unexposed portions of the adhesive. Subsequently, another glass substrate was pressed onto the developed bonding pattern of the adhesive and the thus obtained structure was heated to 120° C. followed by 60 second irradiation by the super-high-pressure mercury lamp. Then, the structure was further heated to 160° C. and kept at this temperature for 60 minutes, thus effecting a heat-treatment. The test pieces of bonded glass substrates thus obtained were tested to obtain the results as shown in Table 5.

TABLE 5

|  | F₁ | F₂ | F₃ | R₁ | R₂ |
|---|---|---|---|---|---|
| Adhesive set in predetermined pattern? | ○ | ○ | ○ | ○ | ○ |
| State of set adhesive region (Note 3) | ○ | ○ | ○ | X | X |

Note 3:
Evaluation done in the same manner as evaluation in Table 4. Mark X represents that adhesive does not substantially adheres to one of the glass substrates.

Evaluation 4

Examples 1 to 3 of the adhesive of the present invention was applied to one of a pair of glass substrates having surface protrusions and recesses as shown in FIG. 1(a). The application was conducted by means of a roll coater so as to obtain an adhesive film thickness of about 7 μm in the set state as in the case of Evaluation 2. Subsequently, another glass substrate of the similar form was adhered to the above-mentioned glass substrate such that these sheets are bonded together at their protrusions.

Subsequently, the adhered glass substrates were cut so as to exhibit the cross-section of the region where these substrates are bonded together by the adhesive, and the amount of adhesive that was spread out was measured. The amount of spread-out adhesive was confirmed to be extremely small.

What is claimed is:

1. A photosensitive and heat-sensitive adhesive having a composition which comprises:

component (A) comprising a vinylester of an urethanated bisphenol A epoxy resin;

component (B) comprising a partial vinylester of a cresol novolak epoxy resin;

component (C) comprising an acrylic reactive diluent;

component (D) comprising photopolymerization initiator; and component (E) comprising an epoxy cure agent;

wherein the composition ratio range of said component (A): said component (B): said component (C) is 20–60:20–60:10–40 by weight percent based on the total weight of said components (A), (B) and (C).

2. An adhesive according to claim 1, wherein the weight ratio between the total weight of said component (A), component (B) and component (C) and the weight of said component (D) ranges between component (A)+component (B)+component (C):component (D)=100:1 to 100:10.

3. An adhesive according to claim 2, wherein the weight ratio between the weight of said component (B) and the weight of component (E) ranges between component (B): component (E)=100:1 to 100:10.

4. An adhesive according to claim 1, wherein the weight ratio between the weight of said component (B) and the weight of component (E) ranges between component (B): component (E)=100:1 to 100:10.

5. An adhesive according to claim 1, wherein the weight ratio between the total weight of said component (A), component (B) and component (C) and the weight of said component (D) ranges between component (A)+component (B)+component (C):component (D)=100:1 to 100:10.

6. An adhesive according to claim 1, wherein the weight ratio between the weight of said component (B) and the weight of component (E) ranges between component (B): component (E)=100:1 to 100:10.

7. An adhesive according to claim 1, wherein said acrylic reactive diluent is one of mono- to quadri-functional acryl monomers.

8. An adhesive according to claim 1, where said epoxy cure agent is one of a cure agent selected from the group consisting of imidazole derivatives, hydrazide, dicyandiamide, aromatic anhydride polyphenol compound, $BF_3$-amine salt, aluminum complex, and alkoxysilane.

* * * * *

UNITED STATES PATENT AND TRADEMARK OFFICE
CERTIFICATE OF CORRECTION

PATENT NO. : 5,439,956
DATED : August 8, 1995
INVENTOR(S) : HIROMICHI NOGUCHI

Page 1 of 3

It is certified that error appears in the above-identified patent and that said Letters Patent is hereby corrected as shown below:

ON TITLE PAGE

In [56] Reference Cited, under FOREIGN PATENT DOCUMENTS:
"1040311 2/1986 Japan" should read
--61-40311 2/1986 Japan--.

COLUMN 1

Line 54, "to" should read --of--.

COLUMN 3

Line 5, "exhibit" should read -- exhibits--.
Line 48, "resin-" should read --resin,--.
Line 49, ",obtained" should read --obtained--.
Line 55, "bringing" should read --bringing the--.
Line 67, "glutanic" should read --glutamic--.
Line 68, "art," should read --are--.

COLUMN 4

Line 4, "an" should be deleted.
Line 63, "isobronyl" should read --isobornyl--.

COLUMN 5

Line 1, "di(meth)acrylate,dietyleneglycol" should read
--di(meth)acrylate, diethyleneglycol--.
Line 32, "Hydroxy-" should read --hydroxy- --.

UNITED STATES PATENT AND TRADEMARK OFFICE
CERTIFICATE OF CORRECTION

PATENT NO. : 5,439,956
DATED : August 8, 1995
INVENTOR(S) : HIROMICHI NOGUCHI

It is certified that error appears in the above-identified patent and that said Letters Patent is hereby corrected as shown below:

COLUMN 6

Line 45, "small" should be deleted.
    Line 66, "ranges" should read --range--.

COLUMN 8

Line 25, "aqueous" should read --the aqueous-- and "separate" should read --separate an--.

COLUMN 9

Line 63, "365 mm)" should read --365 µm)--.

COLUMN 10

TABLE 5, "$F_1$ $F_2$ $F_3$ $R_1$ $R_2$" should read --Ex. 1   Ex. 2   Ex. 3   Comp. Ex. 1   Comp. Ex. 2--.
    Line 55, "adheres" should read --adhere--.

COLUMN 11

Line 16, "photopolymerization" should read --a photopolymerization--.

COLUMN 12

Lines 9-18, cancel claims 5 and 6.
    Line 21, "acryl" should read --acrylic--.

UNITED STATES PATENT AND TRADEMARK OFFICE
CERTIFICATE OF CORRECTION

PATENT NO. : 5,439,956
DATED : August 8, 1995
INVENTOR(S) : HIROMICHI NOGUCHI

It is certified that error appears in the above-identified patent and that said Letters Patent is hereby corrected as shown below:

COLUMN 12

Line 25, "anyhydride" should read --anhydride--.

Title page, "8 Claims, 2 Drawing Sheets" should read -- 6 Claims, 2 Drawing Sheets--.

Signed and Sealed this

Twenty-eighth Day of November 1995

Attest:

BRUCE LEHMAN

Attesting Officer     Commissioner of Patents and Trademarks